United States Patent [19]

Tsai

[11] Patent Number: 5,726,790
[45] Date of Patent: Mar. 10, 1998

[54] CONVERTER FOR CONVERTING A REFLECTION TYPE SCANNER TO A TRANSPARENCE TYPE SCANNER

[75] Inventor: Jenn-Tsair Tsai, Hsinchu, Taiwan

[73] Assignee: Mustek Systems, Inc., Hsinchu, Taiwan

[21] Appl. No.: 683,435

[22] Filed: Jul. 19, 1996

[51] Int. Cl.$^6$ ........................................ G02B 26/08
[52] U.S. Cl. .................. 359/196; 359/227; 359/230; 358/474; 358/475
[58] Field of Search ........................... 359/196–198, 359/223, 227, 230, 234, 236; 358/471, 474, 475, 487, 494, 473; 250/234, 235; 235/470, 472; 355/67

[56] References Cited

U.S. PATENT DOCUMENTS 5,282,081  1/1994  Chen et al. ........................ 358/474
5,483,356  1/1996  Chen et al. ........................ 358/471

*Primary Examiner*—James Phan
*Attorney, Agent, or Firm*—Bacon & Thomas

[57] ABSTRACT

A converter for converting a reflection type scanner to a transparence type scanner comprising a casing equipped with a window through which light beams for transparence type scanning may pass. Inside the casing at the area of the window is a light distribution plate to transmit and to distribute incidence light beams to all areas of the light distribution plate. At both sides of the window are two light incidence windows through which incidence light beams may pass. Inside the casing at the area of the incidence windows are two reflecting mirrors to reflect the incidence light beams to at least an edge surface of the light distribution plate whereby the incidence light beams enter the light distribution plate and are distributed to the whole area of the light distribution plate. A control device and a noise minimizing device positioned in a reflection type scanner is also disclosed in this invention.

9 Claims, 2 Drawing Sheets

5,726,790

CONVERTER FOR CONVERTING A REFLECTION TYPE SCANNER TO A TRANSPARENCE TYPE SCANNER

FIELD OF THE INVENTION

The present invention relates to a converter for converting a reflection type scanner to a transparence type scanner, especially to a compact converter to convert a reflection type scanner to a transparence type scanner.

BACKGROUND OF THE INVENTION

The optical image scanner is a useful office automation equipment which enables users to input image data into a personal computer for desired processing. The optical image scanner is divided in principle into two groups: the "reflection type scanner" and the "transparence type scanner". The reflection type scanner comprises a charge coupler device (CCD) array, a scanning window and a light source wherein the CCD array and the light source are positioned at the same side of the scanning window. A document with reflective character, containing image data (such as a piece of paper) may be positioned at the scanning window. Light beams emitted by the light source are projected to the document, reflected and sensed by the CCD array. The CCD array picks up the image data components in the light beams, converts the image data into an electronic format and outputs the digitized image data for further processing. In the other hand, the transparence type scanner comprises a CCD array, a scanning window and a light source wherein the CCD array and the light source are positioned at the opposite sides of the scanning window. A document with transparent character, containing image data (such as a slide) may be positioned at the scanning window. Light beams emitted by the light source are projected to the document, pass through the document and are sensed by the CCD array. The CCD array picks up the image data components in the light beams, converts the image data into an electronic format and outputs the digitized image data for further processing.

As described in above, both the reflection type scanner and the transparence type scanner have a CCD array, a scanning window and a light source. The major difference between a reflection type scanner and a transparence type scanner is in the light path. Manufacturers of image scanners wished to provide a reflection-transparence type image scanner. In design such a reflection-transparence type scanner, it is necessary to have two different light sources in one device, due to the fact that the light path of a reflection type scanner is opposite to that of a transparence type scanner. A reflection type to transparence type scanner converter is then invented.

U.S. Pat. Nos. 5,282,081 and 5,483,353, assigned to the applicant of this invention, disclosed a "reflection type to transparence type scanner converter". FIG. 1 illustrates the structure of the reflection type to transparence type scanner converter. As shown in the figure, 1 is a conventional reflection type scanner comprising: a casing 11 with a scanning window 10, a light source 12, a reflecting mirror 13 and a lens (not shown) and a CCD array (not shown). Light beams emitted by the light source 12 are projected to a document D to be scanned through the scanning window 10. The light beams are reflected at the document D, carry the image data on the document D and enter the CCD via the scanning window 10, the reflecting mirror 13 and the lens. The CCD array picks up the image data, converts into an electronic format and outputs to a computer system.

2 represents a reflection type to transparence type scanner converter. As shown in the figure, the reflection type to transparence type scanner converter 2 comprises a casing 21 with a window 20, a light source 22 fastened to the window 20 by a fastening device 23, and a light distribution plate 24. A protection membrane 25 covers the surface of the light distribution plate 24.

The light distribution plate 24 may be made of a polycarbonate resin. This kind of material inherits high light distribution effects. It can distribute incidence light equally to all the areas of the light distribution plate 24 with minimal scattering. The deviation of the distribution of light on the light distribution plate 24 may be controlled to under 3%.

When the transparent scanning is processed, the converter 2 is positioned on the reflection type scanner 1, with the window 20 of the converter 2 and the scanning window 10 of the scanner 1 facing each other. Light beams emitted by the light source 22 are projected to the light distribution plate 24 and are distributed to the whole area of the light distribution plate 24. The light then passes through the window 20, the document D and the scanning window 10, the reflecting mirror 13 and the lens, and enter the CCD array. Image data carried by the light are picked up by the CCD array and converted into an electronic format. The digitized image data may be processed with a computer software or electronic circuits.

In the reflection type to transparence type scanner converter as described above, an additional light source 22 is employed. This factor hinders the possibility to have a compact reflection type to transparence type scanner converter, or a reflection-transparence type scanner. Nevertheless, the manufacture cost for such device can not be reduced.

In addition to this, when a "flat bed" scanner is the case, the light source 22 of the converter 2 shall be moved in synchronization with the CCD array of the scanner. To enable this synchronized motion, complicated driving and controlling components are required, resulting in higher manufacture costs.

PURPOSES OF THE INVENTION

It is thus the purpose of the present invention to provide a novel converter for converting a reflection type scanner to a transparence type scanner.

Another purpose of the present invention is to provide a converter for converting a reflection type scanner to a transparence type scanner without an additional light source.

A further purpose of this invention is to provide a compact and simplified converter for converting a reflection type scanner to a transparence type scanner.

BRIEF DESCRIPTION OF THE INVENTION

According to this invention a converter for converting a reflection type scanner to a transparence type scanner is disclosed. The converter for converting a reflection type scanner to a transparence type scanner of this invention comprises a casing equipped with a window through which light beams for transparence type scanning may pass. Inside the casing at the area of the window is a light distribution plate to transmit and to distribute incidence light beams to all areas of the light distribution plate. At both sides of the scanning window are two light incidence windows through which incidence light beams may pass. Inside the casing at the area of the incidence windows are two reflecting mirrors to reflect the incidence light beams to at least an edge surface of the light distribution plate whereby the incidence light beams enter the light distribution plate and are equally distributed to the whole area of the light distribution plate. A control device and a noise minimizing device positioned in a reflection type scanner is also disclosed in this invention.

The purposes and advantages of this invention may be fully understood from the detailed description by referring to the following drawings.

In the figures.

DETAILED DESCRIPTION OF THE INVENTION

The following is a detailed description of the converter for converting a reflection type scanner to a transparence type scanner of this invention.

Figure 2:
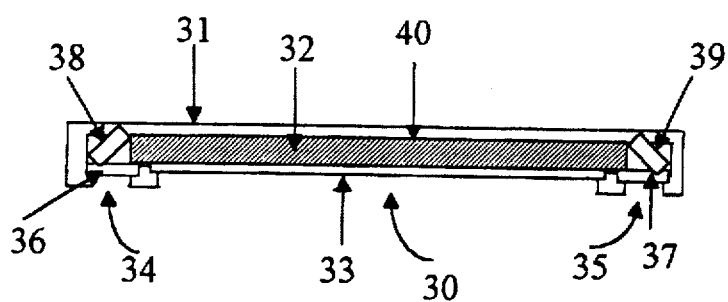
FIG. 2 illustrates the structure of one embodiment of the converter for converting a reflection type scanner to a transparence type scanner of this invention.

FIG. 2 illustrates the structure of an embodiment of the converter for converting a reflection type scanner to a transparence type scanner of this invention. As shown in the invention, the converter for converting a reflection type scanner to a transparence type scanner of this invention comprises: a casing 31 with a window 30 positioned at the top surface, and a light distribution plate 32 inside the casing 31 at the area of the window 30. The light distribution plate may be made of any material with high light distribution quality. A suited example of the material is the above-said polycarbonate resin. The light distribution plate 32 enables an equal distribution of incidence light through to the whole area of the light distribution plate 32, with an deviation of lower than 3%.

In practice, a protection membrane 33 covers the surface of the light distribution plate 32. The protection membrane 33 may be characterized in high transparency and abrasion resistance. In general, glass is a suited example. Of course, plastic material with hardness is applicable in this invention.

In the embodiment of this invention, two light incidence windows 34 and 35 are provided by both sides of the window 30. For the purpose of easier maintenance, the light incidence windows 34 and 35 are sealed with cover plates 36 and 37. Again, suited materials for the cover plates are those with high transparency and abrasion resistance such as glass and plastics with hardness. In practice, the protection membrane 33 and the cover plates 36 and 37 may be one glass plate or one plastic plate.

Inside the light incidence windows 34 and 35 are reflecting mirrors 38 and 39. The mirrors 38 and 39 serve to reflect the incidence light beams to the both sides of the light distribution plate 32 in order for the incidence light beams to enter the light distribution plate 32. The location and angle of the mirrors 38 and 39 may be adjusted during the preparation of the converter.

To enhance the reflection efficiency of the mirrors 38 and 39, it is recommended to use concave mirrors. In addition, a reflection layer 40 may be coated or applied to the surface of the light distribution plate 32 which is opposite to the window 30.

Figure 1:
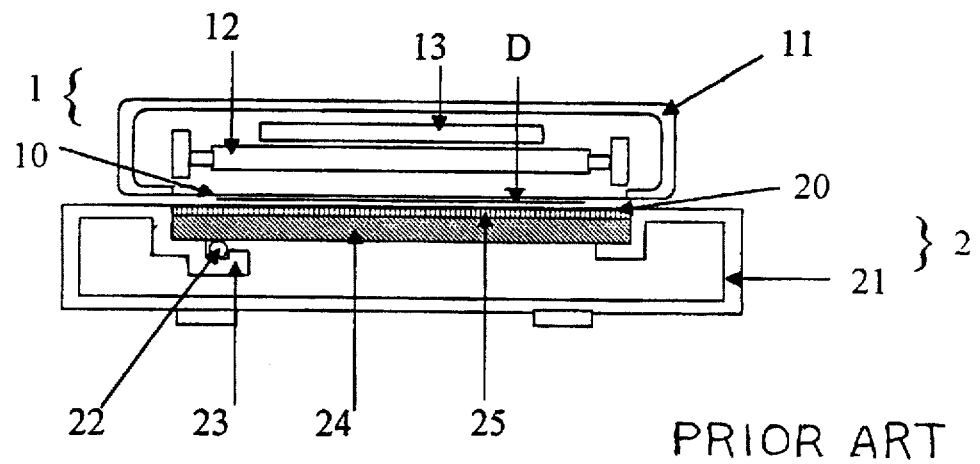
FIG. 1 illustrates the structure of a conventional reflection type to transparence type scanner converter.
Figure 3:
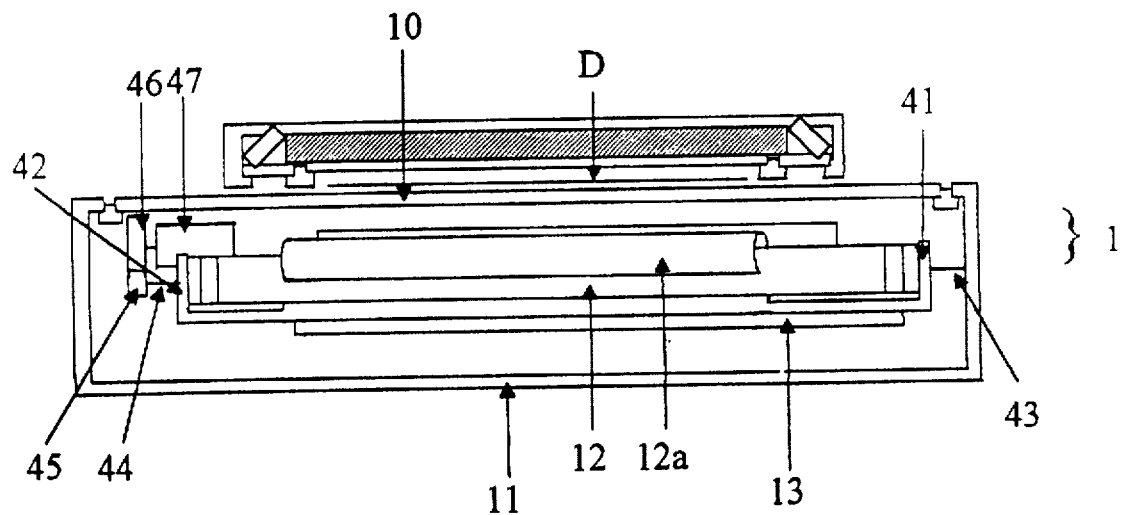
FIG. 3 illustrates the structure of the converter for converting a reflection type scanner to a transparence type scanner of this invention in combination with a reflection type scanner.

FIG. 3 illustrates the structure of the converter for converting a reflection type scanner to a transparence type scanner of this invention in combination with a reflection type scanner. In this figure, elements that appear in FIG. 1 are labeled with same numbers.

In the application of the converter for converting a reflection type scanner to a transparence type scanner of this invention, light beams emitted from the light source 12 of the reflection type scanner 1 are projected partially to the incident light windows 34 and 35, of the converter 3. The latter light beams are reflected at the reflecting mirrors 38 and 39 and enter into the light distribution plate 32. The incidence light beams are distributed in the light distribution plate 32 and reach the document D at the window 30.

The document D is made of a transparent material and carries image data thereon. As light beams pass through the document D, the image data are carried by the light beams and enter the CCD array through the scanning window 10, the reflecting mirror 13 and the lens (not shown). The CCD array picks up the image data and transforms the image data into an electronic format. The digitized image data are output for further processing.

Figure 4:
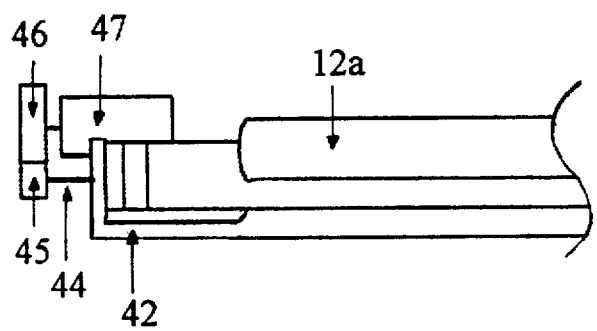
FIG. 4 illustrates the structure of a light source mechanism suited in the converter for converting a reflection type scanner to a transparence type scanner of this invention.

In another embodiment of the converter for converting a reflection type scanner to a transparence type scanner of this invention, a light source mechanism at the light source 12 of the scanner 1 is employed to enhance the effect of the transparent scanning. FIG. 4 illustrates the structure of a light source mechanism suited in the converter for converting a reflection type scanner to a transparence type scanner of this invention.

As shown in the figure the light source mechanism comprises a mask 12a. The mask 12a is a metal or plastic curved plate surrounding the central portion of the light source 12 of the scanner 1. The two ends of the mask does not surround the light source 12 and is connected to terminal plates 41 and 42. At the Centre of the terminal plates 41 and 42 are shafts 43 and 44. The shafts 43 and 44 are ratably connected with the casing 21.

Material suited for the mask 12a includes non-transparent materials. Coating or steaming of metal membrane in the internal surface of the mask is recommended.

One shaft 44 of the mask 12a is connected with a gear 45. Power from a stepping motor 47 is transmitted to the shaft via a gear 46, or other proper elements. With the power of the stepping motor 47, the mask 12a can rotate at the shafts 43 and 44 for about 180 degrees. The stepping motor 47 is controlled by a controller (not shown).

When transparent scanning is desired, the controller controls the stepping motor 47 to rotate the mask 12a to the position as shown in FIG. 4. Under such situation the light source 12 is covered by the mask relative to the scanning window. The light emitted from the central portion of the light source 12 is hindered from being projected to the scanning window 10 and to the document D. The light emitted from the side portions of the light source 12 enters the light incidence window 34 and 35 and enter the light distribution plate via the reflecting mirrors 38 and 39. The incidence light serves as the light source for the transparence scanning.

When reflective scanning is desired, the controller controls the stepping motor 47 to rotate the mask 12a for about 180 degrees. Under such situation the light source 12 is not covered by the mask relative to the scanning window. The light emitted from the central portion of the light source 12 is projected to the scanning window 10 and to the document D. Reflective scanning is thus proceeded.

Effects of the Invention

As described above, in the converter for converting a reflection type scanner to a transparence type scanner of this invention, no additional light source is required. A compact, low-cost and simplified converter for converting a reflection type scanner to a transparence type scanner is thus obtained. In addition, the light source mechanism of this invention is easy to prepare. A dramatic enhancement in the effects of the transparence type scanning is obvious.

As the invention has been shown and described with reference to preferred embodiments thereof, those skilled in the art will recognize that the above and other changes may be made therein without departing from the spirit and scope of the invention.

What is claimed is:

1. A converter for converting a reflection type scanner to a transparence type scanner comprising:
    a casing;
    a window opened at said casing;
    a light distribution plate to distribute incidence light to the whole area of said light distribution plate;
    at least one light incidence window besides at least one side of said window at said casing; and
    at least one reflecting mirror to reflect incidence light from said at least one light incidence window to said light distribution plate.

2. The converter for converting a reflection type scanner to a transparence type scanner of claim 1 further comprising a protection membrane to cover a surface of said light distribution plate at said window.

3. The converter for converting a reflection type scanner to a transparence type scanner of claim 2 wherein said protection membrane covers and seals said at least one light incidence window.

4. The converter for converting a reflection type scanner to a transparence type scanner of claim 1 further comprising a cover to seal said at least one light incidence window.

5. The converter for converting a reflection type scanner to a transparence type scanner of claim 1 wherein said reflection mirrors are concave mirrors.

6. The converter for converting a reflection type scanner to a transparence type scanner of claim 1 further comprising a reflecting layer applied to a surface of said light distribution plate at the opposite side of said window.

7. The converter for converting a reflection type scanner to a transparence type scanner of claim 1 further comprising a light source mechanism and a control means; wherein said light source mechanism comprises a light tube, a mask capable to cover at least the central portion of said light tube and a rotation means to rotate said mask and wherein said control means provides control signals to control the operation of said light source mechanism.

8. The converter for converting a reflection type scanner to a transparence type scanner of claim 7 wherein said rotation means further comprising a stepping motor.

9. A reflection-transparence type scanner comprising:
    a light source mechanism comprising a light source to emit light beams for reflection type and transparent type scanning;
    a charge coupler device array to sense the brightness of incident light beams and to transform said brightness into an electronic format; and
    a converter comprising:
        a casing;
        a window opened at said casing;
        a light distribution plate to distribute incidence light to the whole area of said light distribution plate;
        at least one light incidence window besides at least one side of said window at said casing; and
        at least one reflecting mirror to reflect incidence light from said at least one light incidence window to said light distribution plate;
    wherein said light source mechanism further comprises a mask capable to cover at least the central portion of said light source, a rotation means to rotate said mask and a control means to control the rotation of said mask.

* * * * *